(12) United States Patent
Doolan et al.

(10) Patent No.: US 10,552,408 B2
(45) Date of Patent: Feb. 4, 2020

(54) AUTOMATIC LINEARIZABILITY CHECKING OF OPERATIONS ON CONCURRENT DATA STRUCTURES

(71) Applicant: Oracle International Corporation, Redwood Shores, CA (US)

(72) Inventors: Patrick James Doolan, Brisbane (AU); Chenyi Zhang, Chapel Hill (AU); Graeme Paul Smith, Brisbane (AU); Padmanabhan Krishnan, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 322 days.

(21) Appl. No.: 15/341,980

(22) Filed: Nov. 2, 2016

(65) Prior Publication Data

US 2018/0121488 A1    May 3, 2018

(51) Int. Cl.
 *G06F 16/23* (2019.01)
(52) U.S. Cl.
 CPC ...... *G06F 16/2379* (2019.01); *G06F 16/2308* (2019.01)
(58) Field of Classification Search
 CPC ......... G06F 17/30377; G06F 17/30348; G06F 16/2379; G06F 16/2308
 USPC ...................................................... 707/690
 See application file for complete search history.

(56) References Cited

U.S. PATENT DOCUMENTS

| | | | | |
|---|---|---|---|---|
| 5,168,554 | A * | 12/1992 | Luke ..................... | G06F 11/323 714/E11.181 |
| 5,524,241 | A * | 6/1996 | Ghoneimy ............. | G06F 9/466 707/676 |
| 6,549,920 | B1 * | 4/2003 | Obara ................. | G06F 11/2064 |
| 6,882,993 | B1 * | 4/2005 | Lawande ............ | G06F 16/2393 707/714 |
| 7,139,765 | B1 * | 11/2006 | Balkany .............. | G06F 16/2246 |
| 7,779,165 | B2 * | 8/2010 | Moir ...................... | G06F 9/466 710/15 |

(Continued)

OTHER PUBLICATIONS

Sebastian Burckhardt, Chris Dern, Madanlal Musuvathi, and Roy Tan, "Line-Up: A Complete and Automatic Linearizability Checker", vol. 45, ACM, Jun. 5-10, 2010, 11 pages.

(Continued)

*Primary Examiner* — Pierre M Vital
*Assistant Examiner* — Nargis Sultana
(74) *Attorney, Agent, or Firm* — Ferguson Braswell Fraser Kubasta PC

(57) ABSTRACT

A method may include executing operation types on a concurrent data structure to obtain executed operations. Each executed operation may cause a transition from a preceding state to a subsequent state. The method may further include recording each executed operation to obtain recorded operations, and assembling a concurrent history from the recorded operations. The concurrent history may include a subset of the recorded operations, and the concurrent history may impose overlapping and non-overlapping relationships on the subset of recorded operations. The method may further include checking whether the concurrent history has an equivalent linearization including a total sequential ordering of the subset of recorded operations, and reporting an error when the concurrent history has no equivalent linearization.

17 Claims, 12 Drawing Sheets

(56) References Cited

U.S. PATENT DOCUMENTS

| | | | | |
|---|---|---|---|---|
| 8,607,249 | B2* | 12/2013 | Otenko | G06F 9/52 |
| | | | | 719/314 |
| 10,001,760 | B1* | 6/2018 | Hoffmann | G05B 13/048 |
| 10,089,214 | B1* | 10/2018 | Dixit | G06F 11/0793 |
| 2001/0049704 | A1* | 12/2001 | Hamburg | G06F 17/24 |
| | | | | 715/234 |
| 2002/0095645 | A1* | 7/2002 | Rodeh | G06F 17/504 |
| | | | | 716/106 |
| 2002/0133476 | A1* | 9/2002 | Reinhardt | G06F 16/221 |
| 2004/0064439 | A1* | 4/2004 | Hinshaw | G06F 16/2308 |
| 2005/0086648 | A1* | 4/2005 | Andrews | G06F 11/3608 |
| | | | | 717/135 |
| 2006/0037026 | A1* | 2/2006 | Doherty | G06F 12/0261 |
| | | | | 719/310 |
| 2006/0053219 | A1* | 3/2006 | Kutsumi | G06Q 30/02 |
| | | | | 709/224 |
| 2006/0248073 | A1* | 11/2006 | Jones | G06F 16/3328 |
| 2006/0282419 | A1* | 12/2006 | Sen | G06F 11/3636 |
| 2008/0052330 | A1* | 2/2008 | Beer | G06Q 10/06 |
| 2009/0048998 | A1* | 2/2009 | Kaminsky | G06N 5/025 |
| | | | | 706/47 |
| 2009/0106412 | A1* | 4/2009 | Mori | H04L 41/00 |
| | | | | 709/223 |
| 2009/0248727 | A1* | 10/2009 | Hughes | G06F 16/2477 |
| 2009/0282288 | A1* | 11/2009 | Wang | G06F 11/3612 |
| | | | | 714/37 |
| 2010/0205484 | A1* | 8/2010 | Dragicevic | G06F 11/3636 |
| | | | | 714/37 |
| 2011/0106776 | A1* | 5/2011 | Vik | G06F 9/451 |
| | | | | 707/698 |
| 2011/0167412 | A1* | 7/2011 | Kahlon | G06F 11/3608 |
| | | | | 717/128 |
| 2011/0258490 | A1* | 10/2011 | Burckhardt | G06F 11/3672 |
| | | | | 714/35 |
| 2013/0305105 | A1* | 11/2013 | Chuchem | G06F 11/263 |
| | | | | 714/719 |
| 2015/0039280 | A1* | 2/2015 | Larimore | G06F 17/5018 |
| | | | | 703/2 |
| 2015/0074063 | A1* | 3/2015 | Hugg | G06F 16/2365 |
| | | | | 707/690 |
| 2016/0125305 | A1* | 5/2016 | Moon | G06N 7/005 |
| | | | | 706/52 |
| 2016/0335170 | A1* | 11/2016 | Yakuwa | G06F 11/36 |
| 2016/0381290 | A1* | 12/2016 | Prayle | H04N 5/23203 |
| | | | | 348/207.11 |

OTHER PUBLICATIONS

Simon Doherty, David L Detlefs, Lindsay Groves, Christine H Flood, Victor Luchangco, Paul A Martin, Mark Moir, Nir Shavit, and Guy L Steele Jr., "DCAS is not a Silver Bullet for Nonblocking Algorithm Design", Symposium on Parallelism in Algorithms and Architectures, ACM, Jun. 27-30, 2004, 9 pages.

Simon Doherty, Lindsay Groves, Victor Luchangco, and Mark Moir, "Formal Verification of a Practical Lock-Free Queue Algorithm", In Formal Techniques for Networked and Distributed Systems—FORTE 2004, Springer, Jan. 1, 2004, 16 pages.

Zhenyue Long and Yu Zhang, "Checking Linearizability with Fine-Grained Traces", In ACM Symposium on Applied Computing, ACM, Apr. 4-8, 2016, 7 pages.

Viktor Vafeiadis. "Shape-Value Abstraction for Verifying Linearizability". In Verification, Model Checking, and Abstract Interpretation, Springer, Jan. 1, 2009, 14 pages.

Martin Vechev, Eran Yahav, and Greta Yorsh. "Experience with Model Checking Linearizability". In Model Checking Software, Springer, Jan. 1, 2009, 18 pages.

Shao Jie Zhang, "Scalable Automatic Linearizability Checking", In Proceedings of the 33rd International Conference on Software Engineering, ACM, May 21-28, 2011, 3 pages.

* cited by examiner

Concurrent
History
510

|— Operation O1 → 1 —|
    512

|— Operation O2 → 2 —|
    514

|— Operation P → True —|
    516

Sub-History H
520

Sub-History I
540

Sub-History J
560

Repeated State/
Operation Pair
599

AUTOMATIC LINEARIZABILITY CHECKING OF OPERATIONS ON CONCURRENT DATA STRUCTURES

BACKGROUND

Supporting concurrent access to data structures is crucial for the performance of multithreaded programs in shared-memory multiprocessor environments. This motivates programmers to create objects with fewer safety mechanisms (such as locks, which impose a performance overhead) to achieve greater concurrency. However, greater concurrency also increases the difficulty of verifying correctness of the concurrent data structure and the operations performed on the concurrent data structure. Many techniques have been proposed for verifying concurrent data structures, but are not scalable, and often are restricted to a few threads and a few operations. Model checking has been used for verifying concurrent data structures relative to the correctness condition 'linearizability'.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including executing operation types on a concurrent data structure to obtain executed operations. Each executed operation causes a transition from a preceding state to a subsequent state. The method further includes recording each executed operation to obtain recorded operations, and assembling a concurrent history from the recorded operations. The concurrent history includes a subset of the recorded operations, and the concurrent history imposes overlapping and non-overlapping relationships on the subset of recorded operations. The method further includes checking whether the concurrent history has an equivalent linearization including a total sequential ordering of the subset of recorded operations, and reporting an error when the concurrent history has no equivalent linearization.

In general, in one aspect, one or more embodiments relate to a system including a processor, a memory coupled to the processor, a repository, configured to store a concurrent data structure and operation types, and a linearizability analyzer, executing on the processor and using the memory, including an operation executor/recorder configured to execute the operation types on the concurrent data structure to obtain executed operations. Each executed operation causes a transition from a preceding state to a subsequent state. The operation executor/recorder is further configured to record each executed operation to obtain recorded operations. The system further includes a concurrent history assembler configured to assemble a concurrent history from the recorded operations. The concurrent history includes a subset of the recorded operations, and the concurrent history imposes overlapping and non-overlapping relationships on the subset of recorded operations. The system further includes a linearization checker configured to check whether the concurrent history has an equivalent linearization including a total sequential ordering of the subset of recorded operations, and report an error when the concurrent history has no equivalent linearization.

In general, in one aspect, one or more embodiments of the invention relate to a non-transitory computer readable medium including instructions that, when executed by a computer processor, perform a method including executing operation types on a concurrent data structure to obtain executed operations. Each executed operation causes a transition from a preceding state to a subsequent state. The method further includes recording each executed operation to obtain recorded operations, and assembling a concurrent history from the recorded operations. The concurrent history includes a subset of the recorded operations, and the concurrent history imposes overlapping and non-overlapping relationships on the subset of recorded operations. The method further includes checking whether the concurrent history has an equivalent linearization including a total sequential ordering of the subset of recorded operations, and reporting an error when the concurrent history has no equivalent linearization.

Other aspects of the invention will be apparent from the following description and the appended claims.

DETAILED DESCRIPTION

Figure 1A:
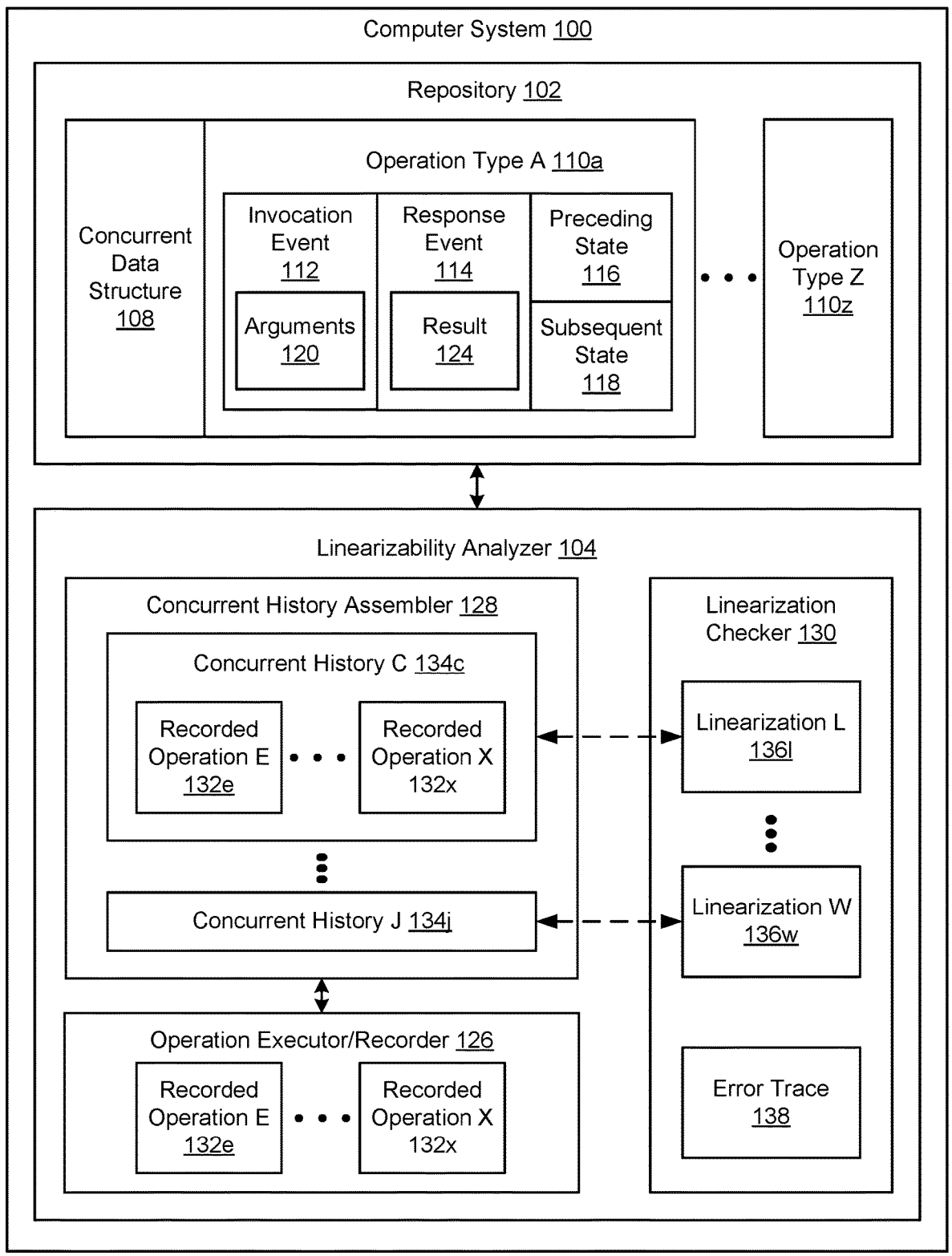
FIG. 1A, FIG. 1B, FIG. 1C and FIG. 1D show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention involve analyzing a concurrent data structure. In one or more embodiments of the invention, errors in the implementation of the concurrent data structure and its associated operations are detected automatically and efficiently by exploring a search space resulting from executing various permutations of overlapping and sequential operations on the concurrent data structure. Each operation may cause a transition from a preceding state to a subsequent state. A compact, de-contextualized representation of state is used to reduce the size of the search space. For example, the representation of state does not include the history of operations resulting in the generation of each state.

Each operation may be recorded during the operation execution phase. Subsets of recorded operations may be subsequently assembled into concurrent histories for error analysis. One criterion for determining the correctness of a concurrent history is whether the concurrent history is linearizable. That is, a concurrent history may be analyzed to determine whether it is possible to identify a corresponding sequential history whose behavior is consistent with the concurrent history, where the sequential history imposes a sequential (i.e., total) order on the overlapping operations of the concurrent history. In order to accurately and efficiently explore the state space using the compact, de-contextualized representation of state, a mechanism is required to determine whether repeated states encountered during the search are equivalent, in which case the search may backtrack by abandoning a redundant branch of the search.

FIG. 1A shows a system in accordance with one or more embodiments of the invention. As shown in FIG. 1A, the system includes a computer system (100) that includes a repository (102) and a linearizability analyzer (104). In one or more embodiments, the computer system (100) may be the computing system (600) described with respect to FIG. 6A and the accompanying description below, or may be the client device (626) described with respect to FIG. 6B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes a concurrent data structure (108) and operation types (110a-110z) that may be executed on the concurrent data structure (108). A concurrent data structure (108) may be a data structure that is specifically designed for concurrent access via the operation types (110a-110z). That is, a concurrent data structure (108) may be used concurrently by multiple threads (e.g., somewhat analogous to executing a loop where the execution of loop iterations may be interleaved). Examples, of concurrent data structures (108) include concurrent queues, concurrent sets, concurrent trees, etc. Each operation type (110a-110z) may correspond to an abstract operation type (not shown) that specifies the behavior to be implemented by the corresponding operation type (110a-110z). Examples, of operation types (110a-110z) include inserting an element into a concurrent data structure (108), removing an element from a concurrent data structure (108), etc.

In one or more embodiments, an operation type (110a-110z) includes an invocation event (112), a response event (114), a preceding state (116) and a subsequent state (118). In one or more embodiments, the execution (e.g., instantiation) of an operation type (110a-110z) includes an invocation event (112) followed by a response event (114). That is, there may be a gap in time between invoking the execution of the operation type (110a-110z) and observing the response due to executing the operation type (110a-110z).

An invocation event (112) may include arguments (120). The arguments may be input parameters of the operation type (110a-110z). A thread (not shown) may execute the invocation event (112). A response event (114) may include a result (124). The result (124) may be the output parameter of the operation type (110a-110z). A thread may execute the response event (114). Executing the operation type (110a-110z) may cause a transition from a preceding state (116) to a subsequent state (118). In one or more embodiments, a state (116, 118) may include a state of the concurrent data structure (108). In one or more embodiments, a state (116, 118) may include states of various local and/or global variables.

It can be challenging to ensure correct, coherent behavior of a concurrent data structure (108) and its associated operation types (110a-110z) in the presence of unsynchronized, concurrent access (e.g., by multiple threads). That is, between the point in time at which the invocation event (112) occurs and the point in time at which the response event (114) occurs, the state (e.g., the preceding state (116)) may have changed. For example, an operation type (110a-110z) that accesses an element of a concurrent data structure (108) may suddenly discover that between the point in time when the operation type (110a-110z) is invoked, and the point in time when accessing the element is actually attempted, that the element has already been removed (e.g., marked for removal) by another thread. Therefore, special consideration may be required when implementing operation types (110a-110z) to account for the potential interference of concurrent threads relative to the concurrent data structure (108) and/or other state variables. For example, additional checks may be performed during the execution of the operation type (110a-110z) prior to actually performing an access or modification to the concurrent data structure (108) and/or other state variables. For example, the operation type (110a-110z) may be restarted, or even aborted in response to detecting interference by another thread.

Continuing with FIG. 1A, the linearizability analyzer (104) may include an operation executor/recorder (126), a concurrent history assembler (128), and a linearization checker (130). The linearizability analyzer (104) may be implemented in hardware (e.g., circuitry), software, or any combination thereof. In one or more embodiments, the operation executor/recorder (126) includes functionality to execute operation types (110a-110z) in various combinations. For example, an operation type (110a-110z) may be executed multiple times with different arguments (120), in different preceding states (116), to obtain different results (124), in different subsequent states (118). In one or more embodiments, the operation executor/recorder (126) may explore the behavior of the concurrent data structure (108) by non-deterministically executing, using one or more threads, operation types (110a-110z) on the concurrent data structure (108) in various combinations to form execution histories, referred to as concurrent histories (134c-134j).

The operation executor/recorder (126) may be implemented in hardware (e.g., circuitry), software, or any combination thereof. In one or more embodiments, the operation executor/recorder (126) includes functionality to generate recorded operations (132e-132x) that record the execution of operation types (110a-110z) for subsequent analysis (e.g., to detect errors in implementing the concurrent data structure (108) and its associated operation types (110a-110z)). That is, the correctness of the concurrent data structure (108) may be assessed by executing, and then analyzing various combinations of operation types (110a-110z).

In one or more embodiments, the operation executor/recorder (126) includes functionality to output recorded operations (132*e*-132*x*) to the concurrent history assembler (128) for subsequent synthesis into concurrent histories (132*c*-132*j*) (e.g., instead of having the operation executor/recorder (126) itself synthesize a list of recorded operations (132*e*-132*x*) into a concurrent history (132*c*-132*j*)).

In one or more embodiments, the operation executor/recorder (126) includes functionality to associate an index with each recorded operation (132*e*-132*x*). In one or more embodiments, the index associates the recorded operation (132*e*-132*x*) with the concurrent history (132*c*-132*j*) that includes the recorded operation (132*e*-132*x*), in order to facilitate the subsequent assembly of recorded operations (132*e*-132*x*) into concurrent histories (132*c*-132*j*) (e.g., by the concurrent history assembler (128)). In one or more embodiments, the index may be stored as a global variable. In one or more embodiments, the index may be stored as metadata (e.g., metadata associated with each recorded operation (132*e*-132*x*)).

In one or more embodiments, a concurrent history (132*c*-132*j*) is a collection of recorded operations (132*e*-132*x*). In one or more embodiments, a concurrent history (132*c*-132*j*) may impose ordering relationships on its recorded operations (132*e*-132*x*). In one or more embodiments, ordering relationships may be inferred from timestamps associated with the recorded operations (132*e*-132*x*) (e.g., timestamps corresponding to invocation events (112) and response events (114)). In one or more embodiments, ordering relationships may include overlapping relationships and non-overlapping relationships. Each overlapping relationship may specify that the execution of a pair of recorded operations (132*e*-132*x*) may overlap (e.g., be executed concurrently by different threads). Each non-overlapping relationship may specify that the execution of a pair of recorded operations (132*e*-132*x*) proceeds sequentially (e.g., the execution of one recorded operation (132*e*-132*x*) in the pair completes before the execution of the other recorded operation (132*e*-132*x*) in the pair commences).

Continuing with FIG. 1A, the concurrent history assembler (128) may be implemented in hardware (e.g., circuitry), software, or any combination thereof. In one or more embodiments, the concurrent history assembler (128) includes functionality to assemble a concurrent history (132*c*-132*j*) from a collection of recorded operations (132*e*-132*x*) (e.g., using an index associated with each recorded operation (132*e*-132*x*). In one or more embodiments, the concurrent history assembler (128) includes functionality to receive the collection of recorded operations (132*e*-132*x*) from the operation executor/recorder (126). In one or more embodiments, the concurrent history assembler (128) includes functionality to provide concurrent histories (132*c*-132*j*) to the linearization checker (130).

The linearization checker (130) may be implemented in hardware (e.g., circuitry), software, or any combination thereof. In one or more embodiments, the linearization checker (130) includes functionality to check whether a concurrent history (132*c*-132*j*) has an equivalent linearization (136*l*-136*w*). Detecting errors in the implementation of a concurrent data structure (108) may proceed relative to a definition of correctness, such as the linearizability of the concurrent data structure (108). A concurrent data structure (108) is linearizable if every concurrent history (132*c*-132*j*) executed on the concurrent data structure (108) has an equivalent sequential history, called a linearization (136*l*-136*w*), that conforms to an abstract (i.e., sequential) specification of the concurrent data structure (108), and is consistent with the ordering of the non-overlapping operations of the concurrent history (132*c*-132*j*). That is, a linearizable concurrent data structure (108) behaves as if it were a sequential data structure (i.e., a data structure that is accessed sequentially, rather than concurrently). In one or more embodiments, the linearization (136*l*-136*w*) includes only non-overlapping (i.e., sequential) relationships between the recorded operations (132*e*-132*x*) of the concurrent history (132*c*-132*j*). That is, the linearization (136*l*-136*w*) imposes a total, sequential ordering on the recorded operations (132*e*-132*x*) of the concurrent history (134*c*-134*j*).

The concept of linearizability is useful for programmers because it may allow them to view each operation on a concurrent data structure (108) as occurring instantaneously at a single point in time, called the linearization point. In other words, a linearizable concurrent data structure (108) may behave as if there is no gap in time between the invocation event (112) and the response event (114) of an operation type (110*a*-110*z*) executed on the concurrent data structure (108). That is, in a linearization (136*l*-136*w*), the response event (114) of an executed operation may appear to immediately follow the corresponding invocation event (112).

Figure 1B:
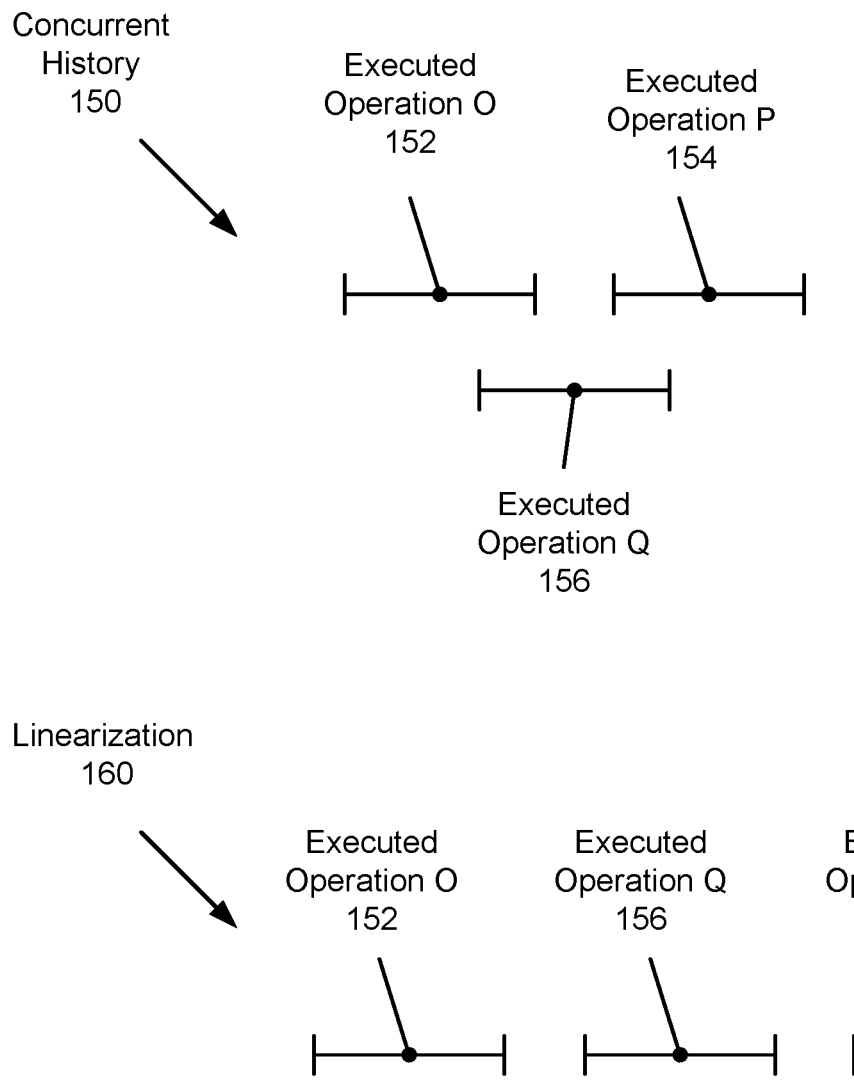

FIG. 1B shows a non-limiting example of a concurrent history (150) that includes three executed operations (152, 154, 156). Executed operation O (152) and executed operation P (154) are non-overlapping. In contrast, both executed operation O (152) and executed operation P (154) overlap with executed operation Q (156).

FIG. 1B also shows a non-limiting example of a linearization (160) of the concurrent history (150), where the overlapping (i.e., concurrent) operations have been sequentialized. That is, the overlap between executed operation O (152) and executed Q (156), and the overlap between executed operation P (154) and executed Q (156) have been eliminated.

Returning to FIG. 1A, in one or more embodiments, the linearization checker (130) includes functionality to explore a search space of sub-histories generated by permutations of sequential orderings of overlapping recorded operations (132*e*-132*x*) of the concurrent history (132*c*-132*j*). A branch of the search space may successively refine a sub-history by sequentializing additional overlapping recorded operations (132*e*-132*x*) of the concurrent history (132*c*-132*j*) until a linearization (136*l*-136*w*) is successfully reached, or the sub-history becomes inconsistent with the concurrent history (132*c*-132*j*). In one or more embodiments, sequentializing overlapping recorded operations (132*e*-132*x*) means forcing the overlapping recorded operations (132*e*-132*x*) to execute in sequence, such that the recorded operations (132*e*-132*x*) no longer overlap.

In one or more embodiments, the linearization checker (130) includes functionality to detect an error in the implementation of the concurrent data structure (108) and its associated operation types (110*a*-110*z*). The error detection may be based on determining that the concurrent data structure (108) has a concurrent history (132*c*-132*j*) that is not linearizable. In one or more embodiments, the linearization checker (130) includes functionality to generate an error trace (138) that includes any non-linearizable concurrent histories (132*c*-132*j*). In one or more embodiments, the error trace (138) may include a description of sub-histories explored during the search whose behavior was inconsistent with the concurrent history (132*c*-132*j*) attempted during the linearization checking process.

In one or more embodiments, the compact, de-contextualized representation of state (116, 118) may be used to reduce the size of the search space. That is, the representation of a state (116, 118) may not include a concurrent history (132c-132j) or the operations (e.g., recorded operations (132e-132x)) resulting in the generation of that state (116, 118). The compact representation of state (116, 118) may facilitate identification of repeated states (116, 118), and therefore may facilitate backtracking to avoid searching a redundant branch of the search space. In contrast, other approaches include a history as part of the representation of each state, resulting in a much larger search space.

Figure 1C:
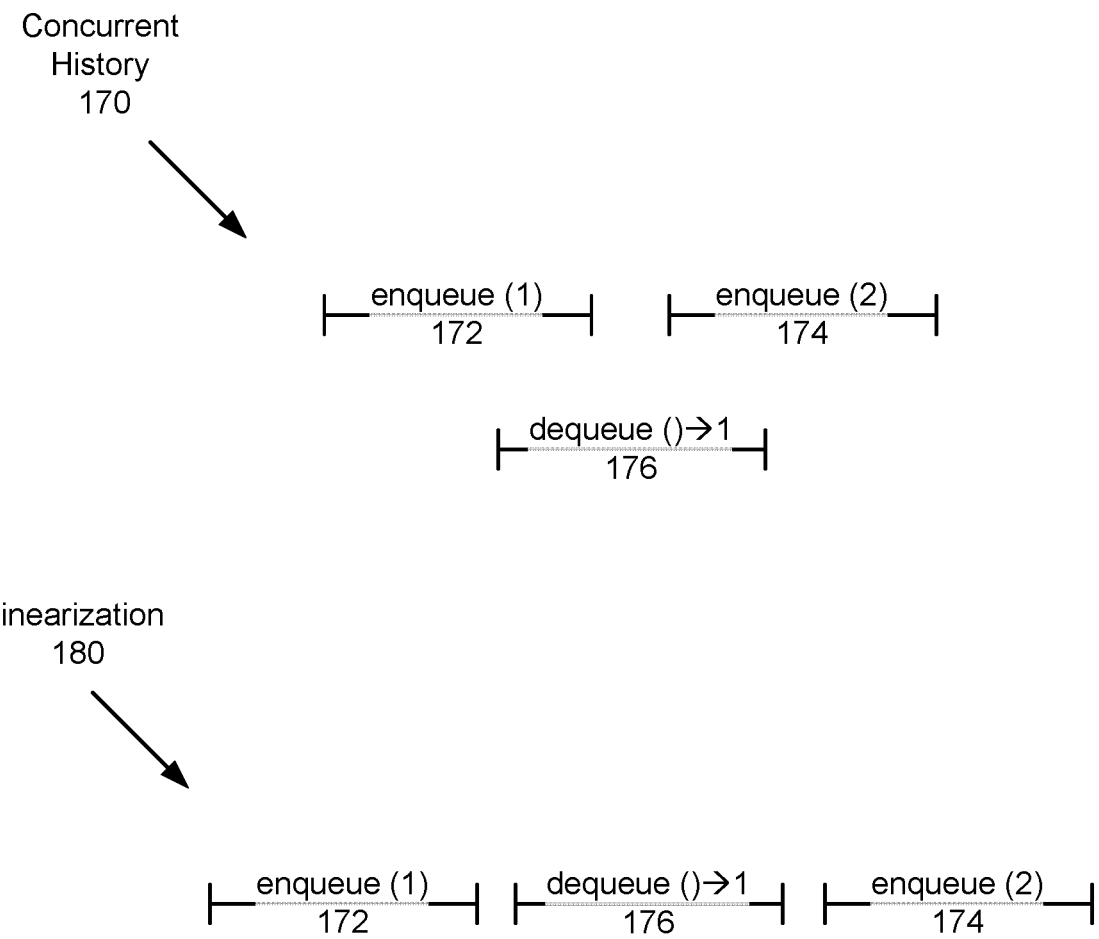

FIG. 1C shows a non-limiting example of a linearizable concurrent history (170). In FIG. 1C, the two non-overlapping enqueue operations (172, 174) both overlap with the dequeue operation (176). FIG. 1C also shows a linearization (180) of concurrent history (170), where the dequeue operation (176) is executed between the two enqueue operations (172, 174). In fact, linearization (180) represents the only valid linearization of concurrent history (170). That is, the dequeue operation (176) may return a value of 1 only if it is executed between the two enqueue operations (172, 174).

Figure 1D:
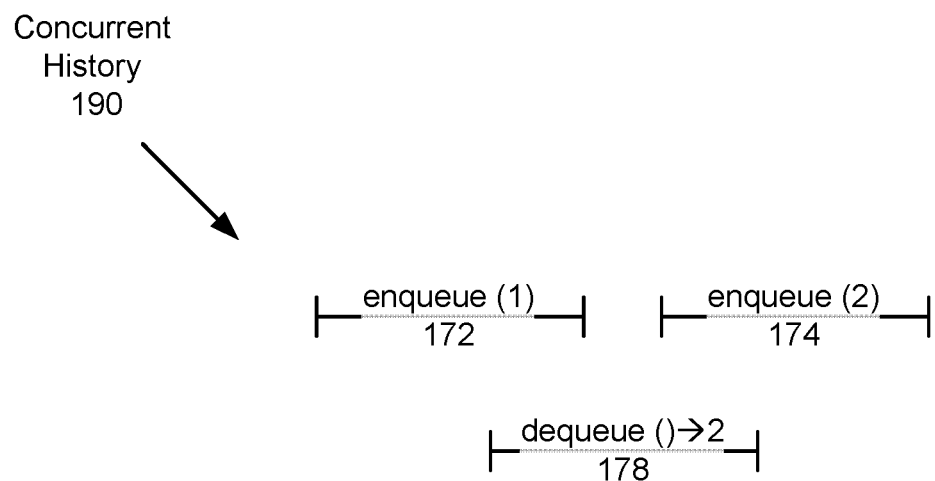

In contrast, FIG. 1D shows a non-limiting example of a non-linearizable concurrent history (190). That is, there is no sequential ordering of the executed operations (172, 174, 178) in FIG. 1D that is consistent with concurrent history (190). In other words, regardless of when the dequeue operation (178) is executed, the dequeue operation (178) cannot possibly return a value of 2. That is, in FIG. 1D, since the two enqueue operations (172, 174) are non-overlapping (i.e., sequentially executed), the dequeue operation (178) will return 'empty' if it is executed before the first enqueue operation (172), and the dequeue operation (178) will return 1 if it is executed after the first enqueue operation (172), but the dequeue operation (178) will never return a value of 2.

While FIG. 1A shows a configuration of components, other configurations may be used without departing from the scope of the invention. For example, various components may be combined to create a single component. As another example, the functionality performed by a single component may be performed by two or more components.

Figure 2:
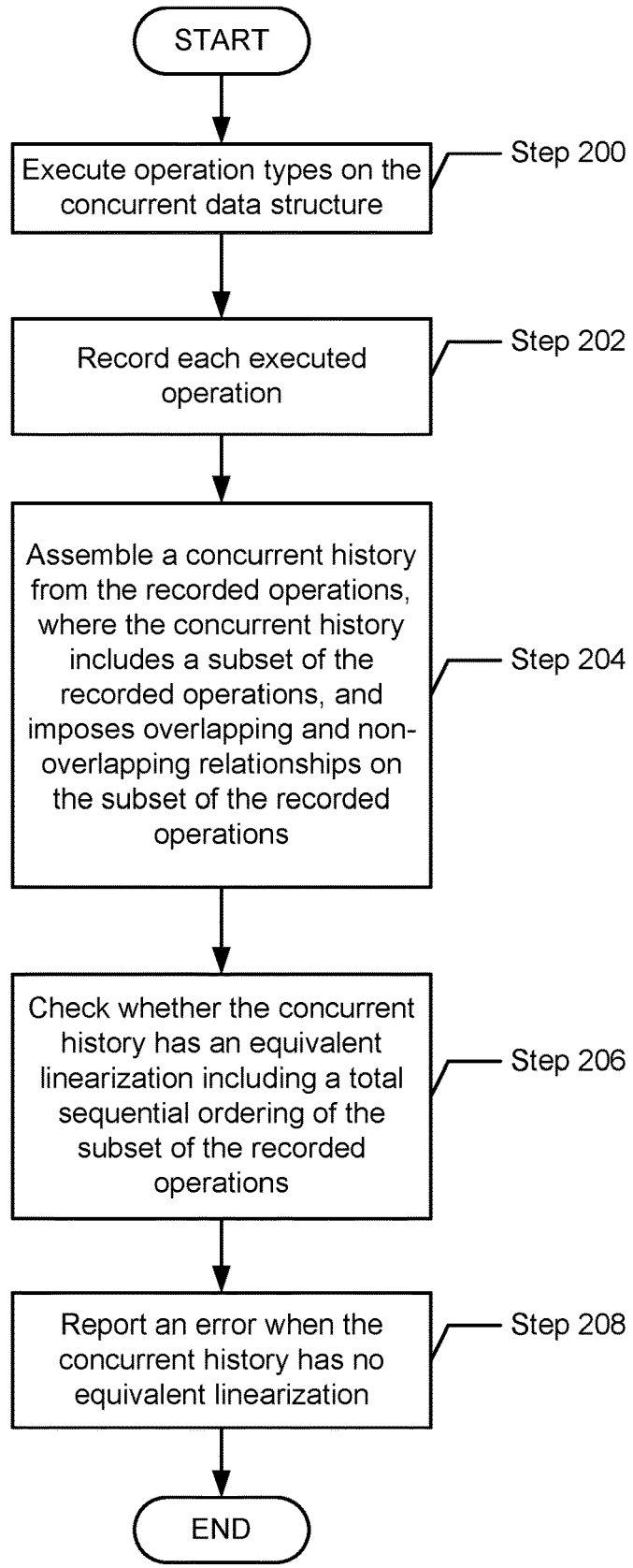
FIG. 2 shows a flowchart in accordance with one or more embodiments of the invention.

FIG. 2 shows a flowchart in accordance with one or more embodiments of the invention. The flowchart depicts a process for analyzing a concurrent data structure. One or more of the steps in FIG. 2 may be performed by the components of the computer system (100), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, operations on the concurrent data structure are executed. For example, an operation type may be executed multiple times with different arguments in different preceding states to obtain different results in different subsequent states. In one or more embodiments, the behavior of the concurrent data structure may be explored by non-deterministically executing (e.g., by the operations executor/recorder described above), using one or more threads, operation types on the concurrent data structure in various combinations.

In Step 202, the executed operations are recorded (e.g., by the operations executor/recorder described above). The recorded operations may be used for subsequent analysis (e.g., to detect errors in implementing the concurrent data structure and its associated operation types). An index may be associated with each recorded operation to facilitate subsequent assembly of the recorded operations into concurrent histories. In one or more embodiments, each index associates the corresponding recorded operation with the concurrent history that includes the recorded operation. In one or more embodiments, the index may be stored as a global variable. In one or more embodiments, the index may be stored as metadata (e.g., metadata associated with each recorded operation).

In Step 204, a concurrent history is assembled from the recorded operations. For example, as described above, the concurrent history assembler may use an index associated with each recorded operation is used to facilitate the assembly of a subset of the recorded operations into the concurrent history. In one or more embodiments, the concurrent history may impose ordering relationships on its recorded operations. In one or more embodiments, ordering relationships may be inferred from start and end timestamps associated with the recorded operations. For example, a start timestamp may associated with an invocation event of a recorded operation, and an end timestamp may associated with an response event of a recorded operation. In one or more embodiments, ordering relationships may include overlapping relationships and non-overlapping relationships. Each overlapping relationship may specify that the execution of a pair of recorded operations may overlap. Each non-overlapping relationship may specify that the execution of a pair of recorded operations proceeds sequentially.

In Step 206, the concurrent history is checked for an equivalent linearization including a total sequential ordering of the subset of the recorded operations. In one or more embodiments, the total sequential ordering of the equivalent linearization is consistent with the ordering of the non-overlapping operations of the concurrent history. Determining the equivalence between the concurrent history and a linearization may be performed by the linearization checker described above, based on comparing corresponding recorded operations of the concurrent history and the linearization. For example, the corresponding recorded operations may have equivalent arguments in corresponding invocation events, equivalent results in corresponding response events, equivalent preceding states, and equivalent subsequent states. Checking the concurrent history is discussed further in the description of FIG. 3B, below.

In one or more embodiments, an equivalent linearization is found by generating variations of the concurrent history that sequentialize the execution of one or more overlapping recorded operations of the concurrent history. That is, each variation of the concurrent history may impose at least one additional sequential (i.e., non-overlapping) constraint on the overlapping recorded operations of the concurrent history. The process of generating variations of the concurrent history may continue until either an equivalent linearization is found, or all variations have been analyzed without finding an equivalent linearization.

In Step 208, an error is reported when the concurrent history has no equivalent linearization. In one or more embodiments, the non-linearizable concurrent history may be added to an error trace associated with the concurrent data structure. Finding a non-linearizable concurrent history may indicate a flaw in the concurrent data structure and/or the operation types associated with the concurrent data structure.

Those skilled in the art, and having the benefit of this Detailed Disclosure, will understand that Step 206 and Step 208, of FIG. 2 may be executed for each concurrent history assembled in Step 204.

Figure 3A:
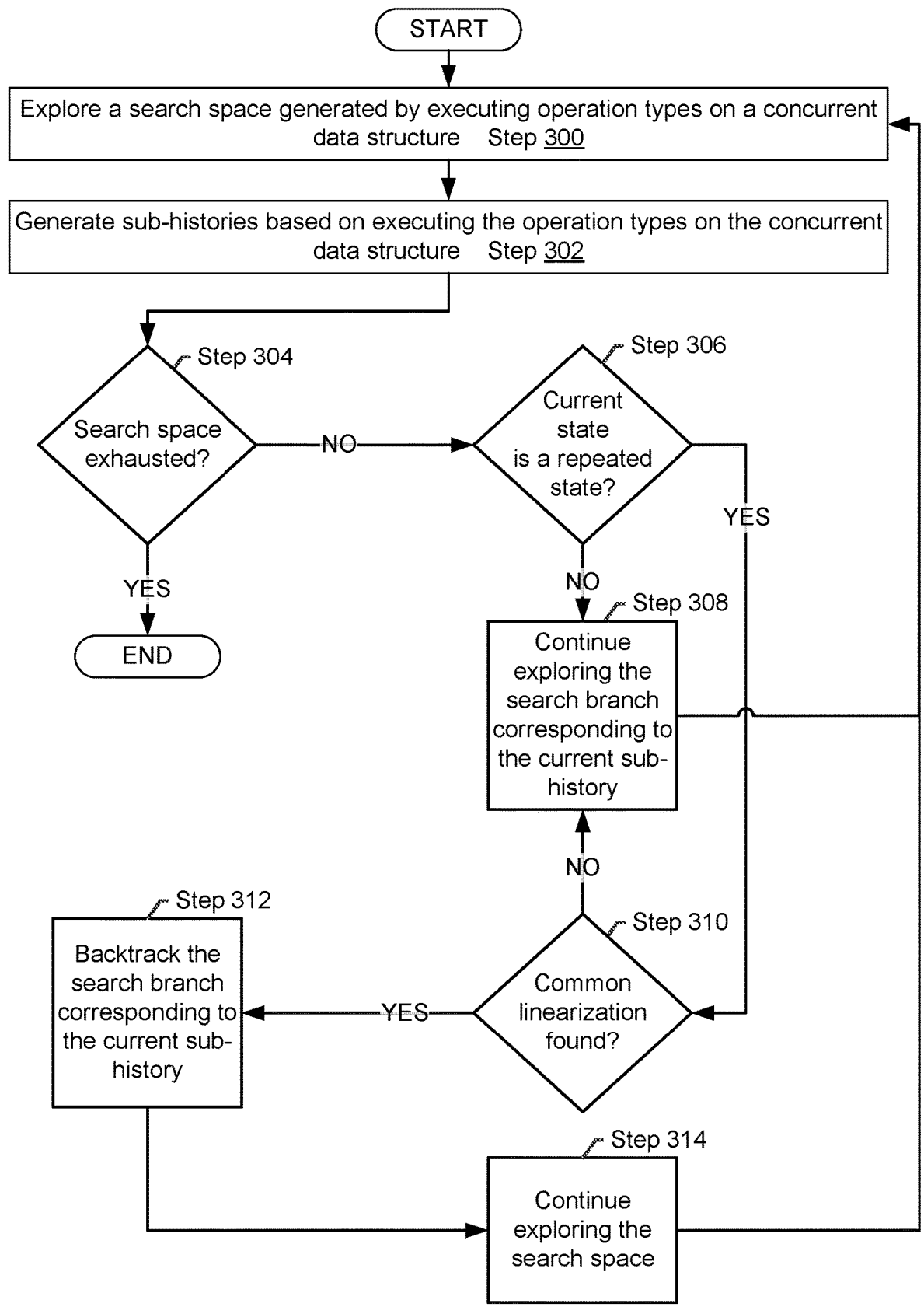
FIG. 3A and FIG. 3B show flowcharts in accordance with one or more embodiments of the invention.

FIG. 3A shows a flowchart in accordance with one or more embodiments of the invention. The flowchart depicts a process for exploring a search space by executing operations on a concurrent data structure. Moreover, the flowchart in FIG. 3A may correspond to Step 200 in FIG. 2. One or more of the steps in FIG. 3A may be performed by the components of the computer system (100), discussed above in reference to FIG. 1A. In one or more embodiments of the invention, one or more of the steps shown in FIG. 3A may be omitted, repeated, and/or performed in a different order than the order shown in FIG. 3A. Accordingly, the scope of the invention should not be considered limited to the specific arrangement of steps shown in FIG. 3A.

Initially, in Step 300, a search space generated by executing operation types on a concurrent data structure is explored. The search space may be explored (e.g., by the operations executor/recorder) using a variety of search techniques (e.g., depth-first search). In one or more embodiments, one or more threads may execute (e.g., non-deterministically) various operation types on the concurrent data structure in various combinations. Executing an operation type may cause a transition from a preceding state to a subsequent state.

In Step 302, sub-histories are generated based on executing the operation types on the concurrent data structure. In one or more embodiments, a sub-history includes a group of executed operations. In one or more embodiments, when an operation type is executed, the corresponding executed operation is added into one or more sub-histories. In this manner sub-histories may be generated and incrementally refined as operation types are executed during the exploration of the search space. In one or more embodiments, when a sub-history satisfies a completion constraint, the sub-history is deemed complete, and may be referred to as a completed concurrent history, or simply a concurrent history. In one or more embodiments, a completion constraint may be based on reaching a desired state (e.g., a state of the concurrent data structure), or reaching a maximum number of executed operation types per concurrent history. Each concurrent history may include overlapping and sequential operations executed on the concurrent data structure.

In Step 304, it is determined whether the search space of concurrent histories is exhausted. In one or more embodiments, the search space may be deemed exhausted when a search constraint is satisfied. Examples of search constraints may include: a limit on the depth of the search space, a limit on the number of operations executed in a concurrent history, and a limit on the number of threads concurrently executing operations on the concurrent data structure.

In Step 306, it is determined whether the current state is equivalent to a previous state. In one or more embodiments, the current state may be a subsequent state resulting from the current sub-history, and the previous state may be a subsequent state resulting from a previous sub-history (i.e., a sub-history previously explored during the search). In one or more embodiments, the current state and the previous state may be considered equivalent if the operation type of the recorded operation executed in the current state corresponds to the same operation type as the recorded operation executed in the previous state (i.e., both recorded operations result from executing the same operation type).

In one or more embodiments, each state encountered during the exploration of the search space is recorded (e.g., using a hash table to improve performance), in order to facilitate the detection of repeated states encountered during the search.

If Step 306 above determines that the current state is equivalent to a previous state, then Step 310 below is performed.

Otherwise, if it is determined (in Step 306 above) that the current state is not a repeated state, then in Step 308, the exploration of the search branch corresponding to the current sub-history continues, in Step 300 above. That is, in one or more embodiments, when the search branch corresponding to the current sub-history has not been previously explored, exploration of the search branch may continue.

In Step 310, if a common linearization is found between the current sub-history and the previous sub-history, then execution proceeds with Step 312, to backtrack the search branch corresponding to the current sub-history. In one or more embodiments, if the repeated state (identified in Step 306 above) was preceded by a linearization common to both the current sub-history and the previous sub-history, then the search branch proceeding from the current state may be considered to be redundant (i.e., explored previously). In one or more embodiments, a repeated state may be considered to be redundant when a common linearization (i.e., a common sequence of operations conforming to the common sequential constraints imposed by the linearization common to both the current sub-history and the previous sub-history) precedes the repeated state, in which case further exploration of the current search branch may be unnecessary. In one or more embodiments, this additional analysis (i.e., checking for the common linearization) may be performed efficiently due to the compact representation of state that does not include the histories that generated the current state and the previous state.

Figure 4A:
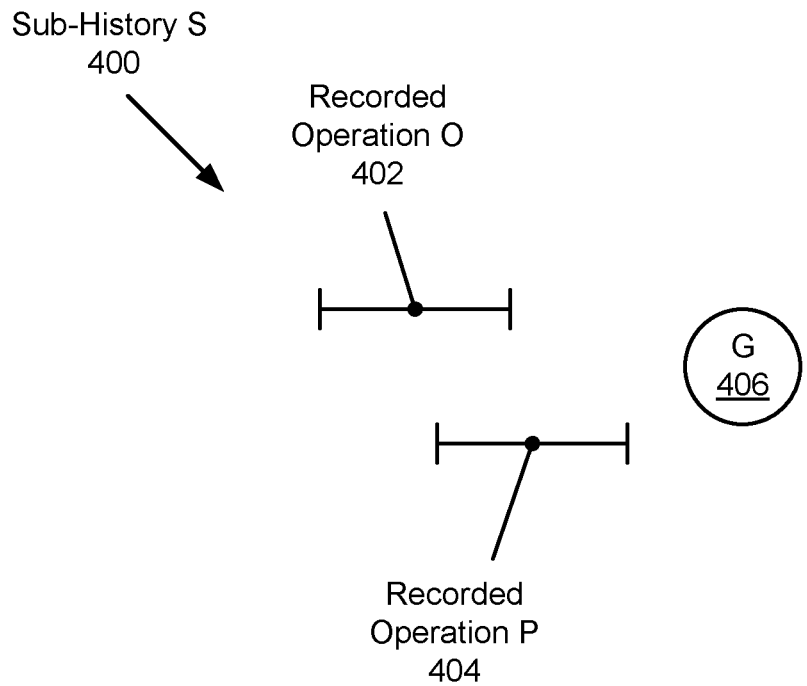
FIG. 4A and FIG. 4B show examples in accordance with one or more embodiments of the invention.
Figure 4B:
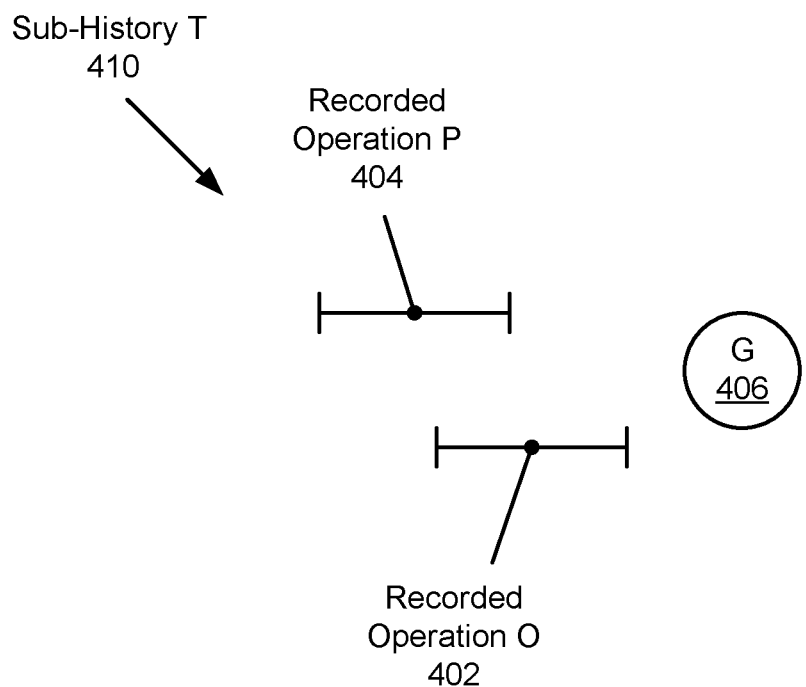

As a non-limiting example, FIG. 4A shows a sub-history S (400) that includes recorded operation O (402) and recorded operation P (404) both preceding a state G (406). FIG. 4B shows a sub-history T (410) that also includes recorded operation O (402) and recorded operation P (404) preceding state G (406). At state G (406) in sub-history T (410) of FIG. 4B, it may be determined that sub-history S (400) and sub-history T (410) share two potential common linearizations: operation O (402) followed by operation P (404), and operation P (404) followed by operation O (402). Therefore, backtracking may be safely performed in the scenario embodied by FIG. 4A and FIG. 4B.

Returning to FIG. 3A, in one or more embodiments, the common linearization sought by Step 310 between the current sub-history and the previous sub-history may be found by executing the method of FIG. 3B (described below) on both the current sub-history and the previous sub-history.

In one or more embodiments, in an alternative implementation of Step 310, it may instead be determined whether the current sub-history has a linearization that could lead to the current state (i.e., instead of finding a common linearization between the current sub-history and the previous sub-history). In one or more embodiments, this alternative approach may require having an abstract specification of the concurrent data structure and its associated operations, and being able to check that an abstract state is consistent with a concrete implementation of the concurrent data structure and its associated operations.

In Step 314, exploration of the search space continues, with Step 300 above.

Figure 3B:
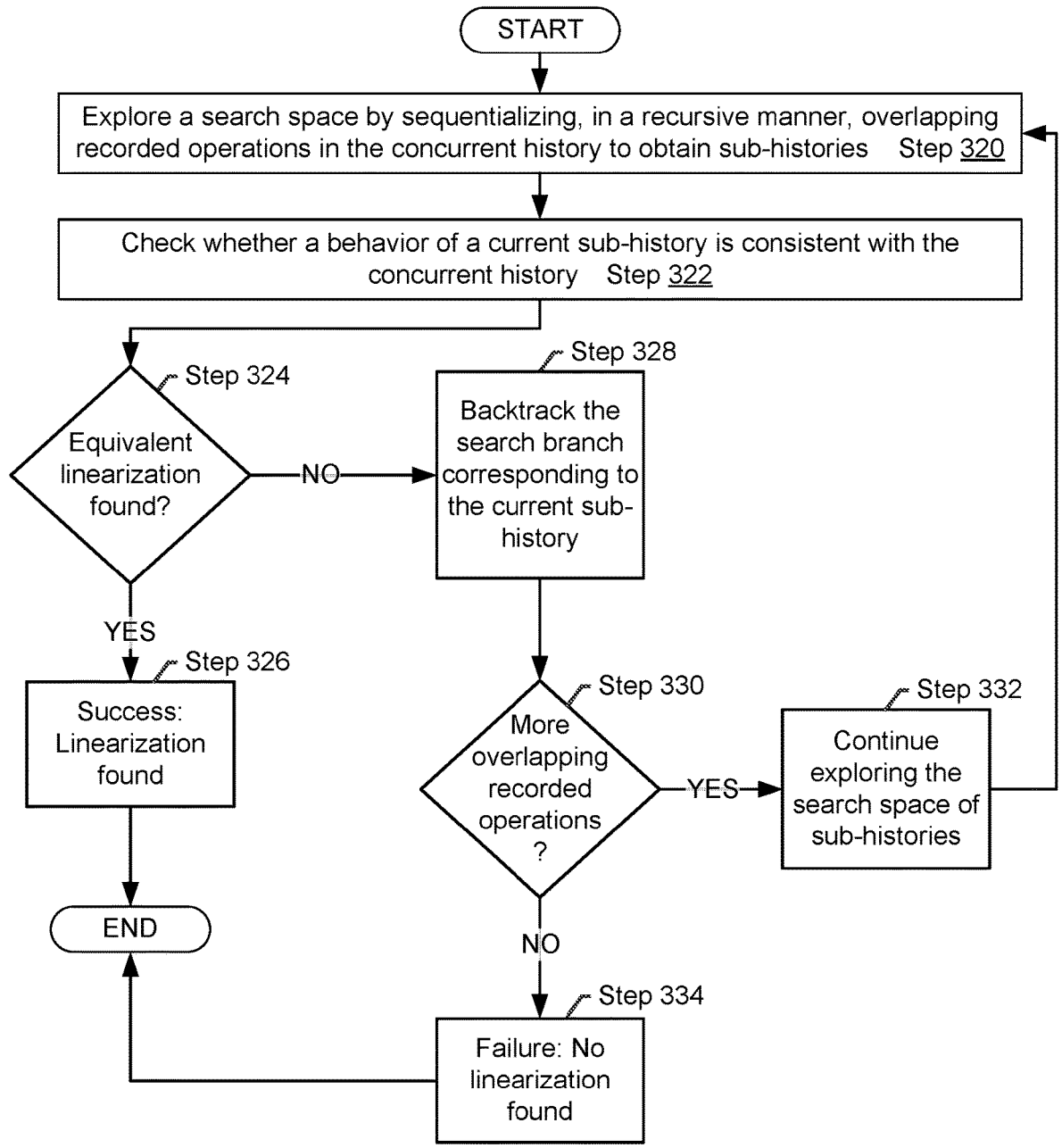

FIG. 3B shows a flowchart in accordance with one or more embodiments of the invention. The flowchart depicts a process for checking a concurrent history for an equivalent linearization. Moreover, the flowchart in FIG. 3B may correspond to Step 206 in FIG. 2. One or more of the steps in FIG. 3B may be performed by the components of the computer system (100), discussed above in reference to FIG. 1A. In one or more embodiments of the invention, one or more of the steps shown in FIG. 3B may be omitted, repeated, and/or performed in a different order than the order shown in FIG. 3B. Accordingly, the scope of the invention should not be considered limited to the specific arrangement of steps shown in FIG. 3B.

Initially, in Step 320, a search space is explored by sequentializing, in a recursive manner, overlapping recorded operations of a concurrent history, to obtain sub-histories. The concurrent history may be the concurrent history assembled in Step 204 above. For example, overlapping recorded operations O and P may be sequentialized in two ways, corresponding to two sub-histories that may be explored in different branches of the search space: 1) by executing operation O before operation P (e.g., so that operation O is completed before operation P is begun), or 2) by executing operation P before operation O (e.g., so that operation P is completed before operation O is begun).

The space of sub-histories generated by sequentializing overlapping recorded operations of the concurrent history may be explored using a variety of search techniques (e.g., depth-first search). In one or more embodiments, each branch of the search tree may be explored by continuing to sequentialize additional overlapping recorded operations of the concurrent history. That is, a tree of sub-histories may be formed by the various permutations of sequentialized overlapping recorded operations of the concurrent history. In one or more embodiments, each sub-history explored in the search space imposes one or more sequential constraints on the overlapping recorded operations of the concurrent history.

In Step 322, a behavior of a current sub-history is checked for consistency with the concurrent history. In one or more embodiments, consistency may be based on comparing the arguments and results of the recorded operations in the current sub-history to the arguments and results of the corresponding recorded operations of the concurrent history. For example, sequentializing overlapping operations may change a result of one or more of the overlapping operations, causing an inconsistency between the sequentialized operations of the current sub-history and the overlapping recorded operations of the concurrent history.

In Step 324, if it is determined that the current sub-history corresponds to an equivalent linearization of the concurrent history, then the concurrent history is linearizable, and the linearizability check has been successful, as indicated in Step 326. That is, the current sub-history may represent an equivalent total, sequential order on the recorded operations of the concurrent history that preserves the real-time ordering of non-overlapping recorded operations of the concurrent history.

In one or more embodiments, if the linearizability check performed in Step 324 above is unsuccessful (i.e., an equivalent linearization of the concurrent history is not found for the current sub-history), then in Step 328 the search branch corresponding to the current sub-history is backtracked. In one or more embodiments, if the current sub-history does not correspond to an equivalent linearization of the concurrent history, then there is no point in further exploration of the search branch corresponding to the current sub-history, and the corresponding search branch may be abandoned.

In Step 330, if there are additional overlapping recorded operations of the concurrent history that have not yet been sequentialized, then in Step 332 exploration of the search space of sub-histories continues. Otherwise, if there are no additional overlapping recorded operations of the concurrent history that have not yet been sequentialized, the concurrent history is deemed non-linearizable, and the linearizability check has failed, as indicated in Step 334. That is, no equivalent total order on the recorded operations of the concurrent history has been found that preserves the ordering of non-overlapping recorded operations of the concurrent history.

In one or more embodiments, the additional cost of generating concurrent histories from recorded operations and subsequently assembling the recorded operations into concurrent histories is offset by the efficient execution of the linearization checker. This may be due to the reduction in the number of histories requiring exploration, which is in turn due to facilitating the identification of repeated states and backtracking redundant branches of the search space. Therefore, large search spaces may be explored, which may enable the detection of errors that require the exploration of large numbers of sub-histories.

Figure 5A:
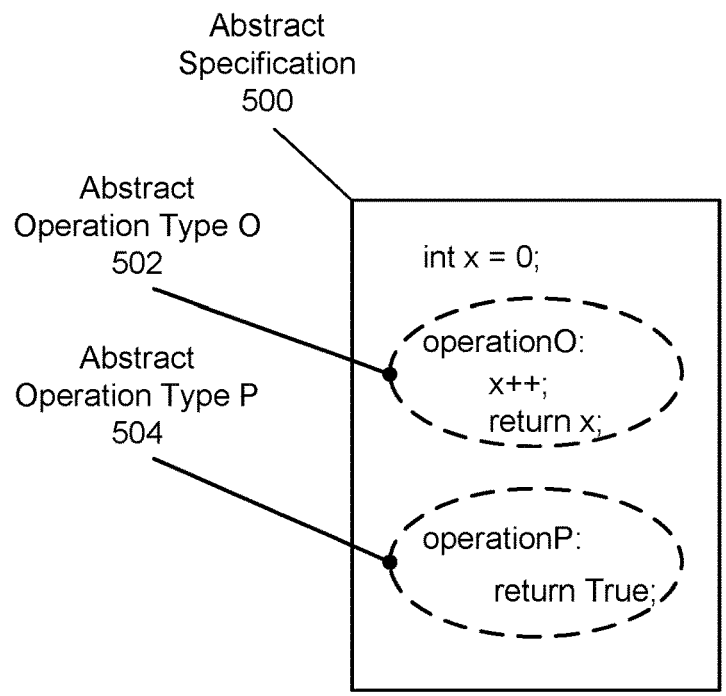
FIG. 5A, FIG. 5B, FIG. 5C and FIG. 5D show examples in accordance with one or more embodiments of the invention.
Figure 5B:
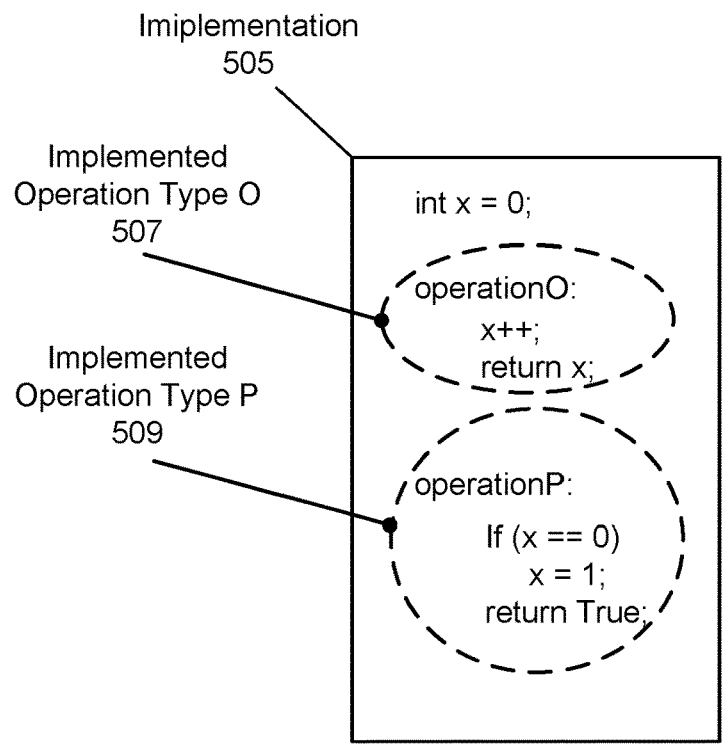

The following example is for explanatory purposes only and not intended to limit the scope of the invention. FIG. 5A, FIG. 5B, FIG. 5C, and FIG. 5D show an implementation example in accordance with one or more embodiments of the invention. FIG. 5A shows an abstract specification (500) for abstract operation type O (502) and abstract operation type P (504). Abstract operation type O (502) increments the value of the state variable x, and abstract operation type P (504) simply returns "True". FIG. 5B shows an implementation (505) corresponding to the abstract specification (500) of FIG. 5A. The implementation (505) includes implemented operation type O (507) and implemented operation type P (509), which correspond to abstract operation type O (502) and abstract operation type P (504) of FIG. 5A, respectively. Implemented operation type P (509) is implemented incorrectly, since it sets the value of the state variable x to 1 if x equals zero, whereas the corresponding abstract operation type P (504) does not modify the value of x. However, this error is not immediately apparent, since only the implemented operation types (507, 509) may be accessible, and therefore may not be checked for consistency relative to the behavior specified by the abstract operation types (502, 504).

Figure 5C:

Various combinations of implemented operation types (e.g., (507) and (509) of FIG. 5B) are executed and recorded (e.g., by the operation executor/recorder (126) of FIG. 1A) and then assembled into concurrent histories (e.g., by the concurrent history assembler (128) of FIG. 1A). FIG. 5C shows an example of a concurrent history (510) that includes three overlapping recorded operations (512, 514, 516) executed by a single thread. Recorded operation O1 (512) and recorded operation O2 (514) are both instances of implemented operation type O (507) of FIG. 5B. However, recorded operation O1 (512) returns a result of 1, and recorded operation O2 (514) returns a result of 2. Recorded operation P (516) is an instance of implemented operation type P (509) of FIG. 5B, and returns a result of "True". The results returned by recorded operations (512, 514, 516) in concurrent history (510) are expected to be equivalent to the results returned by recorded operations (512, 514, 516) in any linearizations derived from concurrent history (510).

Figure 5D:
Figure 5D:
Figure 5D:
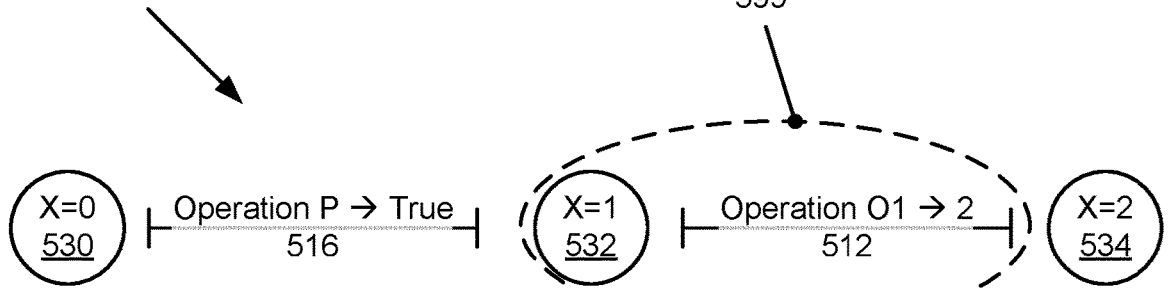

FIG. 5D illustrates sub-histories (520, 540, 560) generated during the exploration of a search space (e.g., by the operation executor/recorder (126) of FIG. 1A) generated by executing operations (512, 514, 516). Sub-history H (520) includes recorded operation O1 (512) followed by recorded operation O2 (514). The value of x is zero in the preceding state (530) of recorded operation O1 (512). The value of x is incremented to 1 in the subsequent state (532) of recorded operation O1 (512). The subsequent state (532) of recorded operation O1 (512) is also the preceding state (532) of recorded operation O2 (514). The value of x is incremented to 2 in the subsequent state (534) of recorded operation O2 (514).

The search subsequently generates sub-history I (540), which includes recorded operation O1 (512) followed by recorded operation P (516). In sub-history I (540), as was the case with sub-history H (520), the value of x is zero in the preceding state (530) of recorded operation O1 (512), and the value of x is incremented to 1 in the subsequent state (532) of recorded operation O1 (512). In sub-history I (540), the subsequent state (532) of recorded operation O1 (512) is also the preceding state (552) of recorded operation P (516). The value of x remains at 1 in the subsequent state (532) of recorded operation P (516).

The search subsequently generates sub-history J (560), which includes recorded operation P (516) followed by recorded operation O1 (512). In sub-history J (560), as was the case with sub-history H (520) and sub-history I (540), the value of x is zero in the preceding state (530) of recorded operation P (516). The value of x is incremented to 1 in the subsequent state (532) of recorded operation P (516). The subsequent state (532) of recorded operation P (516) is also the preceding state (532) of recorded operation O1 (512).

However, when the preceding state (532) of recorded operation O1 (512) is reached during the exploration of sub-history J (560), a repeated state/operation pair (599) is detected. That is, the same preceding state (532) was previously reached during the exploration of sub-history H (520), where another instance of implemented operation type O (507) (i.e., recorded operation O2 (514) of sub-history H (520)) was executed with the same preceding state (532). That is, the combination of both the state (532) and the implemented operation type O (507) has been repeated. In order to determine whether the repeated state/operation pair (599) indicates that a redundant (i.e., already explored) branch of the search space should be backtracked, a common linearization between the portions of the sub-history H (520) and sub-history J (560) preceding the repeated state (532) is sought (e.g., by the linearization checker (130) of FIG. 1A). In this case, no such common linearization exists, since the portion of sub-history J (560) preceding the repeated state (532) consists of recorded operation P (516), and the portion of sub-history H (520) preceding the repeated state (532) consists of recorded operation O1 (512), which clearly cannot linearize to an equivalent sequence (i.e., there is no linearization containing only recorded operation P (516) that is also a linearization of a sub-history containing only recorded operation O1 (512)). Since there is no common linearization between sub-history J (560) and sub-history H (520), no backtracking will be performed, and the search will continue to explore the branch of the search space corresponding to sub-history J (560).

Continuing with the exploration of the search branch corresponding to sub-history J (560), the value of x is incremented to 1 in the subsequent state (532) of recorded operation P (516), which represents an error due to the incorrect implementation of abstract operation type P (504) of FIG. 5A by implemented operation type P (509) of FIG. 5B. In sub-history J (560), the subsequent state (532) of recorded operation P (516) is also the preceding state (532) of recorded operation O1 (512). The value of x is incremented to 2 in the subsequent state (534) of recorded operation O1 (512). However, the result returned by recorded operation O1 (512) in sub-history J (560) is 2, which is inconsistent with the result returned by the corresponding recorded operation O1 (512) of the concurrent history (510) in FIG. 5C. Therefore, an error is detected and reported due to the inconsistent result. Once the error is detected, the branch of the search corresponding to sub-history J (560) is then backtracked (i.e., since there is no point in further exploration of the branch of the search corresponding to the erroneous sub-history J (560)).

The search may then continue by generating additional sub-histories based on executing additional operations.

Figure 6A:
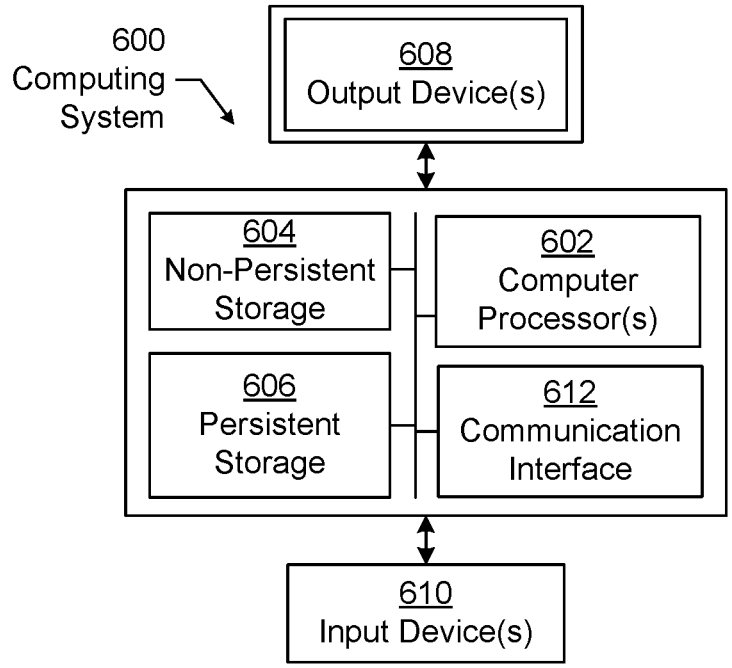
FIG. 6A and FIG. 6B show computing systems in accordance with one or more embodiments of the invention.

Embodiments of the invention may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 6B:
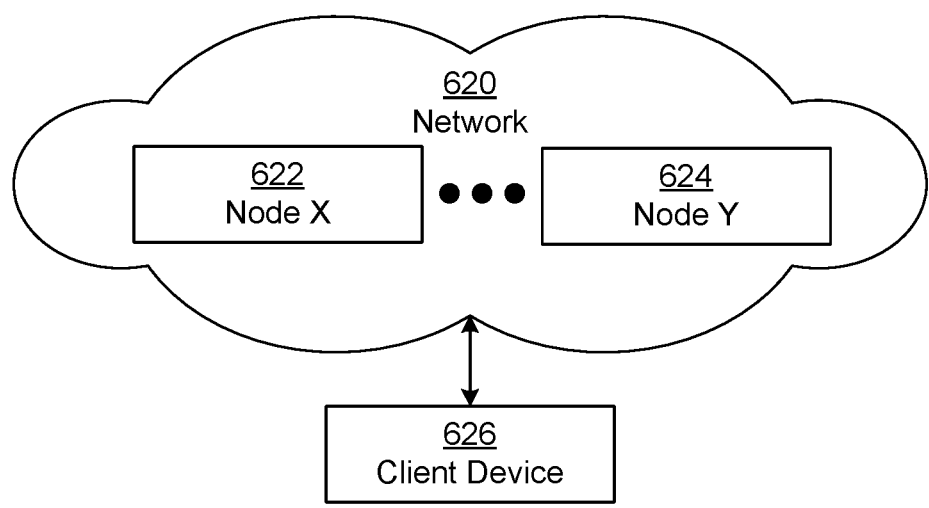

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
executing a plurality of operation types on a concurrent data structure to obtain a plurality of executed operations;
exploring a search space comprising a plurality of sub-histories generated by executing the plurality of operation types on the concurrent data structure;
determining that a current state is equivalent to a previous state, wherein:
the current state is a subsequent state resulting from a first explored sub-history of the plurality of sub-histories, wherein the first explored sub-history imposes relationships on the plurality of executed operations, and
the previous state is a subsequent state resulting from a second explored sub-history of the plurality of sub-histories, wherein the second explored sub-history imposes relationships on the plurality of executed operations;
backtracking, based on determining that the first explored sub-history and the second explored sub-history have a common linearization, a redundant branch of the search space corresponding to the first explored sub-history, wherein each executed operation of the plurality of executed operations causes a transition from a preceding state to a subsequent state;
recording the plurality of executed operations to obtain a plurality of recorded operations;
assembling a concurrent history from the plurality of recorded operations, wherein:
the concurrent history comprises a subset of the plurality of recorded operations, and
the concurrent history imposes overlapping and non-overlapping relationships on the subset of the plurality of recorded operations;
checking whether the concurrent history has an equivalent linearization comprising a total sequential ordering of the subset of the plurality of recorded operations; and
reporting an error when the concurrent history has no equivalent linearization.

2. The method of claim 1, wherein:
the common linearization comprises a total ordering of the recorded operations of the first explored sub-history, and
the common linearization comprises a total ordering of the recorded operations of the second explored sub-history.

3. The method of claim 1, wherein the preceding state does not comprise the concurrent history.

4. The method of claim 1, wherein a recorded operation of the plurality of recorded operations comprises an index indicating a position of the recorded operation in the concurrent history.

5. The method of claim 4, further comprising:
storing the index as metadata associated with the recorded operation.

6. The method of claim 1, wherein:
each executed operation of the plurality of executed operations comprises:

an invocation comprising one or more arguments, and
a response comprising a result.

7. A system, comprising:
a processor;
a memory coupled to the processor;
a repository, configured to store at least a concurrent data structure and a plurality of operation types; and
a linearizability analyzer, executing on the processor and using the memory, comprising:
an operation executor/recorder configured to:
execute the plurality of operation types on the concurrent data structure to obtain a plurality of executed operations;
explore a search space comprising a plurality of sub-histories generated by executing the plurality of operation types on the concurrent data structure;
determine that a current state is equivalent to a previous state, wherein:
the current state is a subsequent state resulting from a first explored sub-history of the plurality of sub-histories, wherein the first explored sub-history imposes relationships on the plurality of executed operations, and
the previous state is a subsequent state resulting from a second explored sub-history of the plurality of sub-histories wherein the second explored sub-history imposes relationships on the plurality of executed operations;
backtrack, based on determining that the first explored sub-history and the second explored sub-history have a common linearization, a redundant branch of the search space corresponding to the first explored sub-history, wherein each executed operation of the plurality of executed operations causes a transition from a preceding state to a subsequent state; and
record the plurality of executed operations to obtain a plurality of recorded operations;
a concurrent history assembler configured to:
assemble a concurrent history from the plurality of recorded operations, wherein:
the concurrent history comprises a subset of the plurality of recorded operations, and
the concurrent history imposes overlapping and non-overlapping relationships on the subset of the plurality of recorded operations; and
a linearization checker configured to:
check whether the concurrent history has an equivalent linearization comprising a total sequential ordering of the subset of the plurality of recorded operations; and
report an error when the concurrent history has no equivalent linearization.

8. The system of claim 7, wherein:
the common linearization comprises a total ordering of the recorded operations of the first explored sub-history, and
the common linearization comprises a total ordering of the recorded operations of the second explored sub-history.

9. The system of claim 7, wherein the preceding state does not comprise the concurrent history.

10. The system of claim 7, wherein a recorded operation of the plurality of recorded operations comprises an index indicating a position of the recorded operation in the concurrent history.

11. The system of claim 10, wherein the operation executor/recorder is further configured to:
store the index as metadata associated with the recorded operation.

12. The system of claim 7, wherein:
each executed operation of the plurality of executed operations comprises:
an invocation comprising one or more arguments, and
a response comprising a result.

13. A non-transitory computer readable medium comprising instructions that, when executed by a computer processor, perform a method comprising:
executing a plurality of operation types on a concurrent data structure to obtain a plurality of executed operations;
exploring a search space comprising a plurality of sub-histories generated by executing the plurality of operation types on the concurrent data structure;
determining that a current state is equivalent to a previous state, wherein:
the current state is a subsequent state resulting from a first explored sub-history of the plurality of sub-histories, wherein the first explored sub-history imposes relationships on the plurality of executed operations, and
the previous state is a subsequent state resulting from a second explored sub-history of the plurality of sub-histories, wherein the second explored sub-history imposes relationships on the plurality of executed operations;
backtracking, based on determining that the first explored sub-history and the second explored sub-history have a common linearization, a redundant branch of the search space corresponding to the first explored sub-history, wherein each executed operation of the plurality of executed operations causes a transition from a preceding state to a subsequent state;
recording the plurality of executed operations to obtain a plurality of recorded operations;
assembling a concurrent history from the plurality of recorded operations, wherein:
the concurrent history comprises a subset of the plurality of recorded operations, and
the concurrent history imposes overlapping and non-overlapping relationships on the subset of the plurality of recorded operations;
checking whether the concurrent history has an equivalent linearization comprising a total sequential ordering of the subset of the plurality of recorded operations; and
reporting an error when the concurrent history has no equivalent linearization.

14. The non-transitory computer readable medium of claim 13, wherein:
the common linearization comprises a total ordering of the recorded operations of the first explored sub-history, and
the common linearization comprises a total ordering of the recorded operations of the second explored sub-history.

15. The non-transitory computer readable medium of claim 13, wherein the preceding state does not comprise the concurrent history.

16. The non-transitory computer readable medium of claim 13, wherein a recorded operation of the plurality of recorded operations comprises an index indicating a position of the recorded operation in the concurrent history.

17. The non-transitory computer readable medium of claim 16, further comprising:

storing the index as metadata associated with the recorded operation.

\* \* \* \* \*

UNITED STATES PATENT AND TRADEMARK OFFICE
CERTIFICATE OF CORRECTION

PATENT NO. : 10,552,408 B2
APPLICATION NO. : 15/341980
DATED : February 4, 2020
INVENTOR(S) : Patrick James Doolan et al.

Page 1 of 1

It is certified that error appears in the above-identified patent and that said Letters Patent is hereby corrected as shown below:

In the Claims

Claim 7, Column 17, Line 27, a -- , -- should be inserted after the word "sub-histories".

Signed and Sealed this
Thirtieth Day of June, 2020

Andrei Iancu
*Director of the United States Patent and Trademark Office*